No. 766,740.

Patented August 2, 1904.

UNITED STATES PATENT OFFICE.

EDWARD HALFORD STRANGE AND EDWARD GRAHAM, OF LONDON, ENGLAND.

PRODUCTION OF PAINTS AND PAINT VEHICLES.

SPECIFICATION forming part of Letters Patent No. 766,740, dated August 2, 1904.

Application filed March 25, 1904. Serial No. 199,944. (No specimens.)

*To all whom it may concern:*

Be it known that we, EDWARD HALFORD STRANGE, M. Sc., and EDWARD GRAHAM, M. Sc., technical research chemists, both subjects of the King of Great Britain and Ireland, and both residing at 7 Staple Inn, London, England, have invented certain new and useful Improvements in the Manufacture and Production of Paints and Paint Vehicles or Varnishes, of which the following is a specification.

This invention relates to the manufacture and production of paints or paint vehicles or varnishes, in which manufacture crude rosin-oil is employed.

It has been found when crude rosin-oil has been used in cojunction with pigments—such, for example, as white lead—in the production of paints that the said paints soon become thick or hard, and experiments which we have made have led us to the conclusion that this is due to the combination of the metallic base of the pigment with organic acids or matters acting as acids contained in the crude rosin-oil.

The object of our invention is to overcome this objection, which we do by treating the crude rosin-oil first with an agent or with agents to partially neutralize the said acids or matters acting as acids and form therewith a compound or compounds which is or are soluble in rosin-oil, but which is or are not soluble in water, and then with such an aforesaid agent or agents as will act more intensively and complete the neutralizing. Suitable agents for the purpose are either the oxids or the hydroxids of calcium, strontium, barium, magnesium, zinc, aluminium, iron, maganese, or lead, or mixtures of such oxids or hydroxids; but we prefer to employ the calcium compounds and of these to use lime to partially neutralize the acids or matters acting like acids and to follow the lime treatment by treatment with an oxid or hydroxid of lead (preferably litharge) to complete the neutralizing.

The following is the method of treatment which we prefer: We introduce the crude rosin-oil into a vessel provided with a stirring appliance and gradually raise the crude rosin-oil to a temperature of about 180° centigrade, and while it is maintained at this temperature we add lime thereto, preferably lime ground into a paste, with a small quantity of neutral refined rosin-oil, gradually stirring in the said lime. The proportion of lime which we employ varies with the acidity of the particular sample of crude rosin-oil being treated and should be in quantity sufficient to nearly neutralize such acidity. When the lime is dissolved, a drier—such, for instance, as a compound of manganese or of lead—is added. We use, preferably, manganese driers, (and of these we prefer manganese resinate.) The amount of drier added depends upon the speed of drying desired in the final product, about five parts, by weight, of fused manganese resinate to every one hundred parts of crude rosin-oil being generally sufficient. If such a drier as manganese dioxid or manganese hydrate be employed, the mixture should be maintained at a temperature of about 220° centigrade in order to bring about the required solution. A darker product results when this method is adopted. In determining the amount of driers to be added allowance can be made for any lead or manganese compounds which have been used in the aforesaid neutralizing, as such compounds will act to some extent as driers. After the drier has dissolved litharge (preferably ground to a paste with a small quantity of neutral refined rosin oil) is gradually stirred in, the temperature during such addition being maintained at about 180° centigrade. An amount of litharge is employed sufficient to neutralize any residual acidity which may remain in the mass after the addition of the lime and the drier. In practice we have found that litharge amounting to from one to one and a half per cent. of the crude rosin-oil employed is a suitable quantity. The litharge in addition to readily neutralizing any residual acidity in the mixture serves to increase the drying power of the finished product. We have described the addition of driers after the addition of the lime and prior to the addition of the litharge because many driers contain free acid; but, if desired, the driers can be added before the treatment with lime. It will be understood from the foregoing that if an oxid or a hydroxid of lead be used in place of the other of the agents mentioned for the first treatment such lead compound can be caused to carry out the neutralization to the end. After the product obtained as aforesaid has been allowed to cool to a temperature of, say, about 50° centigrade it is mixed with a volatile solvent—such, for example, as a fraction of petroleum known as "petroleum-spirit"—sufficient in quantity to give the desired viscosity to the product. The amount of such volatile solvent which is added will vary with the particular sample of crude rosin-oil employed, as well as with the desired viscosity of the finished product. To make a paint, the requisite amount of the selected pigmentary matter is added to and thoroughly incorporated with the paint vehicle or varnish hereinbefore described.

The hardness of the films produced by the drying of thin layers of the paint vehicles or varnishes or paints made as hereinbefore described will vary according to the proportion of organic acids or matters acting as acids contained in the particular sample of crude rosin-oil which has been employed, so that we can manufacture paint vehicles or varnishes and paints capable of giving dry films of varying degrees of hardness by employing in the manufacture crude rosin-oils of varying degrees of acidity.

Paints made by adding the required pigmentary matter to paint vehicles or varnishes made as hereinbefore described do not become thick or hard even after prolonged storage. The paints, paint vehicles or varnishes when applied to surfaces so as to be exposed to the atmosphere in thin layers dry rapidly and form tough and durable films, whether they be applied as varnishes without a pigment or as paints with a pigment.

In the following claims we do not mention the volatile solvent; but it is to be understood that it is presumed to be added as and when required to give the desired viscosity to the product.

We claim as our invention—

1. In the manufacture of paint vehicles, or varnishes from crude rosin-oil, treating the crude rosin-oil first with an agent capable of partially neutralizing the acids (or matters which act as acids) therein and of forming therewith a compound soluble in rosin-oil but insoluble in water, and secondly with another such agent having a more intensive neutralizing action.

2. In the manufacture of paint vehicles, or varnishes, treating crude rosin-oil with lime and afterward with litharge.

3. In the manufacture of paint vehicles, or varnishes, treating crude rosin-oil with lime and a drier and afterward with litharge.

4. The manufacture of paint by treating crude rosin-oil first with an agent to partially neutralize the acids (or matters which act as acids) therein and form therewith a compound soluble in rosin-oil but insoluble in water, and secondly with another such agent having a more intensive neutralizing action, then adding a drier and pigmentary matter.

5. In the manufacture of paint vehicles, or varnishes, heating crude rosin-oil with lime and with a drier and afterward with litharge.

6. In the manufacture of paint vehicles, or varnishes, heating crude rosin-oil with lime and with a compound of manganese and afterward with litharge.

7. In the manufacture of paint, heating crude rosin-oil with lime and with a drier and with litharge and adding pigmentary matter.

8. In the manufacture of paint, heating crude rosin-oil with lime and with a compound of manganese and with litharge and adding pigmentary matter.

9. As a new composition of matter, a paint vehicle, or varnish, containing, litharge, a drier, and rosin-oil, and a compound which is soluble in such oil, but not in water, and which has been formed from the acids, or matters which act as acids, in the crude rosin-oil.

10. As a new composition of matter, a paint containing, a pigmentary matter, litharge, a drier, and rosin-oil, and a compound which is soluble in such oil but not in water and which has been formed from the acids, or matters which act as acids, in the crude rosin-oil.

In testimony whereof we have signed our names to this specification in the presence of two subscribing witnesses.

EDWARD HALFORD STRANGE.
EDWARD GRAHAM.

Witnesses:
WILLIAM GERALD REYNOLDS,
H. D. JAMESON.